2 Sheets—Sheet 1.
W. KOOK & J. L. HALL.
Time-Lock.
No. 214,045. Patented April 8, 1879.
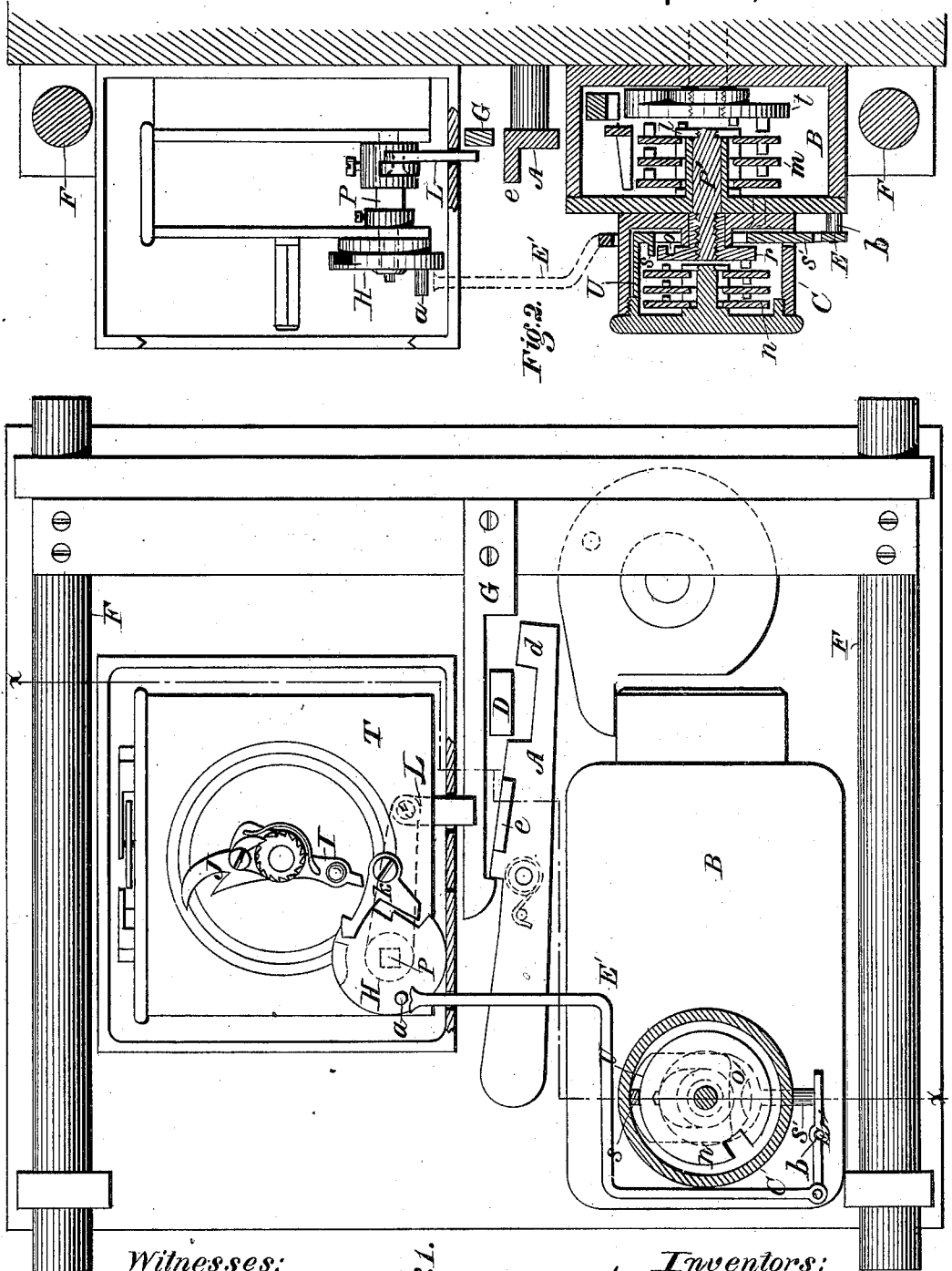
Witnesses:
Donn P. Twitchell.
Will W. Dodge.
Inventors:
Wm Kook &
J. L. Hall,
by Dodge & Son
Attys W. KOOK & J. L. HALL.
Time-Lock.
No. 214,045.  Patented April 8, 1879.
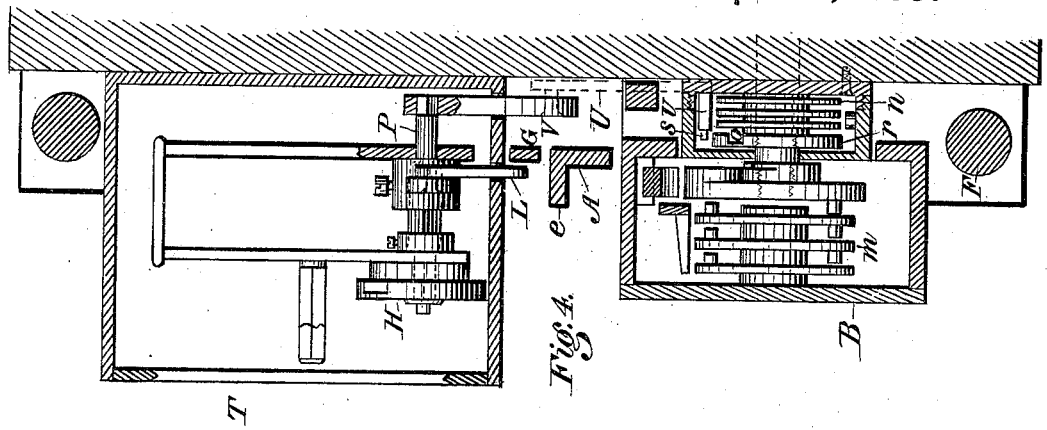
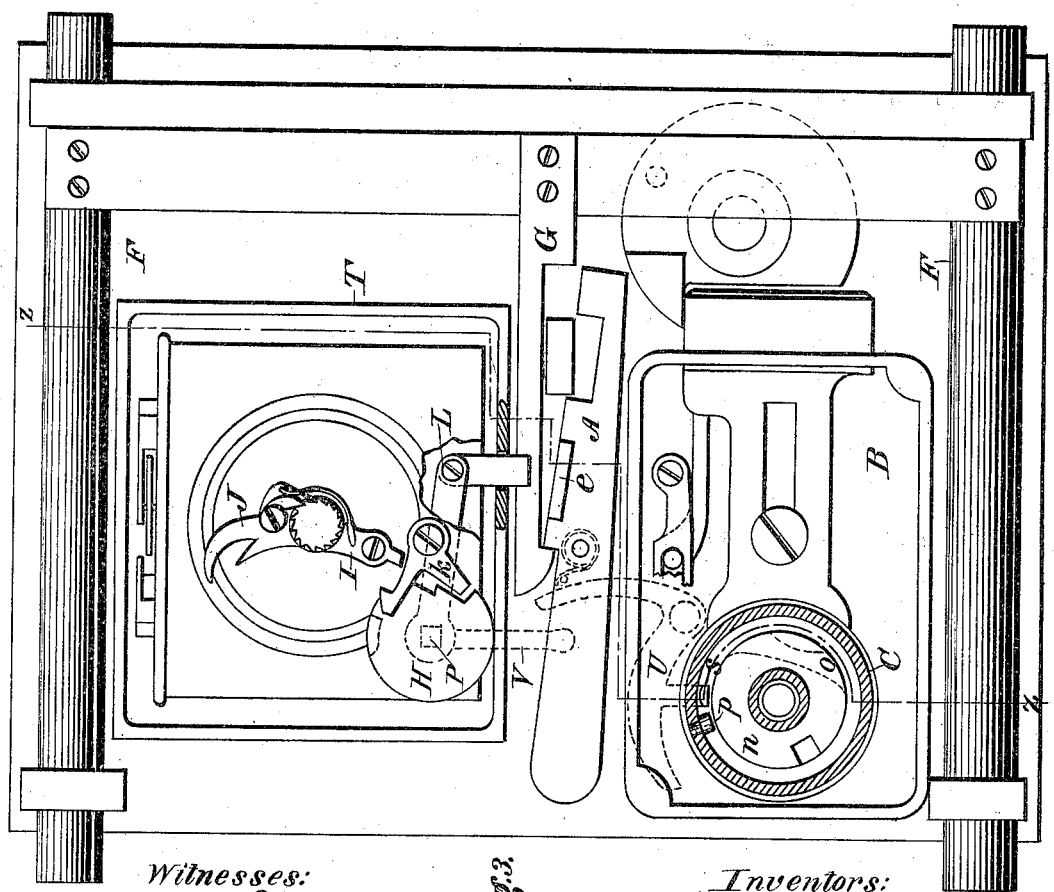

UNITED STATES PATENT OFFICE.

WILLIAM KOOK AND JOSEPH L. HALL, OF CINCINNATI, OHIO; SAID KOOK ASSIGNOR TO SAID HALL.

IMPROVEMENT IN TIME-LOCKS.

Specification forming part of Letters Patent No. 214,045, dated April 8, 1879; application filed October 25, 1878.

*To all whom it may concern:*

Be it known that we, WILLIAM KOOK and JOSEPH L. HALL, of Cincinnati, in the county of Hamilton and State of Ohio, have invented certain Improvements in Time Attachments for Safes, &c., of which the following is a specification.

This invention consists in the combination of an automatic dogging-lever, operating upon the bolt-work at any attempt to retract the latter, and a time attachment, with a lock having two independent sets of tumblers and angle-bars, both sets being operated by one spindle, the whole being arranged to operate in connection with the bolt-work of a safe or vault door, as hereinafter more fully set forth.

Figure 1 is a front elevation, with the extra tumbler-case shown in section. Fig. 2 is a transverse vertical section on the line *x x* of Fig. 1. Fig. 3 is a front elevation, showing the extra tumblers arranged at the rear instead of at the front of the main lock, with a modification of the connecting levers or arms. Fig. 4 is a transverse vertical section of the same on the line *z z* of Fig. 3.

In the drawings, Fig. 1 represents the inner face of a safe or vault door having the ordinary train-bolts F and an ordinary combination-lock, B, applied thereto. A represents a dogging-lever, so arranged that when the bolt-work is thrown forward the front end of the lever is thrown down, and consequently does not dog the bolt-work, but which, as soon as an attempt is made to throw back the bolt-work, has its front end thrown up by a spring, and securely dogs the bolt-work by its front part, *d*, engaging between the fixed stud D and the shoulder on the stump G, which latter is rigidly secured to the connecting-bar of the train-bolts F, as shown in Fig. 1.

T represents a time-movement of any suitable kind, having two hands, I and J, the latter being arranged to engage in a notch in the disk H, which is mounted on a rock-shaft, P, Figs. 1 and 2, to which is secured the operating-arm L. The other hand, I, is arranged to trip the dog *k*, which, acting on the disk H, holds the arm L down until released by the tripping of the dog *k*, there being a spring arranged behind the disk H, which holds the arm L up away from the lever A except when held down by the dog *k*, which is arranged at the time of closing the safe, or is subsequently forced down by the arm J engaging with the notch in the disk H, the object being to keep the safe in a condition so that it can be opened for a limited period after it is shut by operating the main lock B, and thereafter prevent its being opened until the time shall arrive for which the time attachment is set, the same as in the patent to H. Gross, February 8, 1876, No. 173,121, to which reference is made for a more detailed description.

An extra set of tumblers is arranged either on the front or in rear of those of the main lock B, they being represented on the front in Fig. 2. The tumblers *m* of the main lock B are mounted on a hollow shaft, attached to the cover of the lock, as shown in Fig. 2, and through this extends a spindle or shaft, P', for working the extra or secret tumblers *n*, said spindle having at one end a disk, *l*, with a pin projecting from its face, to engage with a corresponding pin projecting from the face of the disk *t*, which is secured to the inner end of the lock-spindle in the usual manner, this disk *t* having also another pin to engage with and operate the tumblers *m* of the main lock in the usual manner, as shown clearly in Fig. 2. Upon the opposite end of the spindle P' is secured another disk, *r*, provided in like manner with a projecting pin for operating the tumblers *n* of the secret lock C, also shown in Fig. 2.

In the lock C is an angle-bar, U, which has a pin, *s*, arranged to drop into the notch *o* in the disk *r*, this notch, as shown in dotted lines in Figs. 1 and 3, being extended across the face of the disk and so formed as to operate as a cam on the pin *s*, thereby depressing the angle-bar U, which, at its lower end, has a stem, *s'*, that projects through a hole in the lower side of the case of lock C, where it presses on a lever, E, pivoted at *b*, and to the opposite end of which is connected a rod, E', the upper end of which engages against a pin, *a*, on the disk H of the time-movement, as shown in Figs. 1 and 2. By this means the arm L of the timer is forced down upon the dogging-lever A, holding it depressed, and thereby enabling the bolt-work to be retracted after the main lock B has been unlocked.

In Figs. 3 and 4 the tumblers $n$ of the secret lock are shown as being placed behind those of the main lock—that is, between them and the face of the door. In this case the angle-bar U is pivoted outside of the case of the lock C, and has an arm projecting into the case, with its fence arranged to drop into the notches of the tumblers $n$ in the usual manner, the point $s$ of the fence in this case engaging in the cam-groove $o$ of the disk $r$ and operating the same, as in the case previously described.

Instead, however, of the depending stem $s'$ the angle-bar U has its front end bent at a right angle, or nearly so, and brought into position to engage against an arm, V, rigidly secured to the rock-shaft P of the timer, as shown in Fig. 3, whereby it is made to throw down the arm L to hold the dogging-lever depressed, the same as before described, the principle and mode of operation being the same, the connections between the secret lock and the timer being modified, as described, simply to adapt them to the changed position of the secret lock. In both cases the case of the secret lock C is so constructed that it cannot be opened to get at the tumblers except when the combination is set up.

It will readily be seen that, by means of the secret lock, the timer can at any time be made to operate on the dogging-lever A and hold it depressed, so that the bolt-work can be operated, and thus the person having control of the secret combination can open the safe not only in case the time-movement should stop, but can also do it while the time-movement is running, and previous to the arrival of the time for which it is set, the main combination, of course, being operated also.

In this arrangement it will be seen that the time-movement has nothing to do with the lock, but simply operates on the automatic dogging-lever to hold it out of operation at the required time for opening the door, which it does by the hand J operating on the disk H, and, through it, on the arm L.

Ordinarily the operation is as follows: The arm L is fastened down by the dog $k$, and the hand I set to trip the dog after any given time. The door is then closed, the bolt shot, and fastened by the main lock B. While in this condition the door can be opened at any time by merely operating the main lock and throwing back the bolts, thus permitting access to the safe for any pre-arranged period after office hours for depositing or removing papers or money, as is often necessary, and which cannot be done where the ordinary time-locks are used. At the appointed time the dog $k$ is tripped by the hand I, which lets the arm L fly up, and from that time on the automatic dogging-lever A will prevent the bolt-work from being retracted until the time arrives for which the timer was set, when the hand J will engage in the notch of disk H, and, by turning it, throw down the arm L, thereby holding the dogging-lever A permanently depressed, when, after operating the main lock, the door can be opened. In case, however, that the time-movement should accidentally stop, or be disarranged by attempts to forcibly open the safe, or in case it should be desired to open it before the time for which it was set shall have arrived, it can be done by operating on the timer through the secret lock.

It will, of course, be understood that the combination of the secret lock will not be given to the party having daily charge of the safe, but will be kept by another party, to be used only in case of emergency, such as stated; and, hence, if burglars should attempt to compel the party in charge to open the safe he could not do it, nor could they even after he had set up the combination of the main lock for them.

It is obvious that this arrangement of the two sets of tumblers can be applied equally well to those time attachments which are arranged to operate upon the main lock, as well as upon the automatic dogging device, as in this case, and that all three sets may be used together.

We are aware that a set of tumblers has been arranged in two divisions with an angle-bar for each division, and both divisions arranged to be operated by a single spindle, and therefore we do not claim such; but,

Having thus described our invention, what we claim is—

1. In combination with the bolt-work of a safe or vault door, an automatic dogging device, A, operating upon the bolt-work at any attempt to retract the latter, a time attachment arranged to hold said dogging device out of operation at a predetermined time, and a secondary set of tumblers arranged on the same center as the tumblers of the main lock, and operated by the spindle thereof for releasing the lever of the time attachment in case said attachment should stop or get out of order.

2. The combination of two or more sets of tumblers, both sets arranged on a common center, but each set in a separate case, one of said cases being so constructed that it can be opened only by means of the tumblers therein, substantially as described.

WM. KOOK.
JOSEPH L. HALL.

Witnesses:
R. W. BULLA,
R. T. PULLEN.